UNITED STATES PATENT OFFICE 2,638,463

POLYMERS FROM PYRROLIDONE

William O. Ney, Jr., Providence, William R. Nummy, Warren, and Carl E. Barnes, Gloucester, R. I., assignors to Arnold, Hoffman & Co., Incorporated, Providence, R. I., a corporation of Rhode Island No Drawing. Application December 7, 1951, Serial No. 260,558

6 Claims. (Cl. 260—78)

This invention relates to the production of new and useful organic polymers from pyrrolidone. Heretofore the teachings in the literature have been to the effect that polymerization of this compound does not take place.

We have discovered that pyrrolidone can be successfully polymerized to produce a useful high molecular weight product which we identify as polypyrrolidone having the structure:

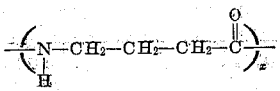

This new polymer is produced either as a dry cake; in the form of coarse granules; or as a fine molding powder and has many desirable properties. For example, polypyrrolidone is thermoplastic, having a melting point between about 250° to 260° C. It may be combined with suitable fillers or extenders and other conventional constituents, e. g., plasticizers, pigments, dyes, etc., and shaped; spread as a film or surface coating; used as an impregnant; and can be extruded, for instance, as fibres or filaments. The polymer is insoluble in all ordinary organic solvents and water as well as in aqueous basic solutions and dilute acid solutions. It is soluble in concentrated hydrochloric acid from which it can be precipitated by neutralization with a base, e. g., ammonia. The dry polymer is a horny resinous mass which is tough and pliable and can be machined, sawed, or otherwise fabricated while cool.

The filaments or fibers are useful for textiles and may be oriented or spun by cold drawing in the conventional manner to impart additional strength and to improve their textile properties. The synthetic fibers may be suitably colored as by pigments or dyes and possess substantial tensile strength and do not swell appreciably in water.

It is the object of this invention to provide new polymeric products and methods of producing the same whereby pyrrolidone may be caused to yield polymers by treatment with catalysts.

The invention will be illustrated in the following examples.

Example I

In a vessel equipped for vacuum distillation and mechanical stirring there is placed 100 parts of pyrrolidone to which is added 25 parts of potassium hydroxide pellets. The water formed is removed by distilling off 10 parts of the mixture. The temperature during this operation is held between about 90° and 120° C. at pressures from about 0.5 to 10 mm. The temperature and pressure just recited are not critical as long as distillation of the water is accomplished. The reaction mixture remaining in the still pot is heated to about 160° C. for six hours under an atmosphere of inert gas such as nitrogen and the system is thereafter once again evacuated, and remaining pyrrolidone is distilled under the conditions described above, namely, at a temperature between about 90° and 120° C. under a pressure of about 0.5 to 10 mm. At all times, care should be taken not to overheat or char the residue which is a mixture of the catalyst and crude polypyrrolidone. The polypyrrolidone is thereafter isolated in relatively pure state by extraction of the residue with hot or cold water whereby the water-soluble catalyst and other soluble impurities are dissolved. The solution is then filtered to recover the relatively pure, insoluble polypyrrolidone. The polypyrrolidone so recovered is in the form of a damp cake which is either air dried or dried in any suitable manner which does not char or decompose the polymer. Preferably, the drying temperature is maintained at 100° C. or lower. The dried product is either an amorphous solid, e. g., as a cake or free-flowing, granular particles or powder. It has a light tan to white color.

To further purify the polymer, 10 parts thereof are dissolved in about 50 to 100 parts, 6-Normal HCl, and the solution treated with activated decolorizing charcoal or carbon. This mixture is then filtered and the polymer is re-precipitated from the solution with ammonia solution to give a uniform white powder.

Example II

Example I is followed except that sodium hydroxide is substituted for potassium hydroxide.

Example III

Example I is followed except that potassium carbonate is substituted for potassium hydroxide.

Example IV

Example I is followed except that sodium carbonate is substituted for potassium hydroxide.

Example V

In a vessel equipped for vacuum distillation and mechanical stirring there is placed 100 parts of pyrrolidone to which is added 25 parts of potassium hydroxide pellets. The water formed is removed by distilling off 10 parts of the mixture. The temperature during this operation is held between 90 and 120° C. at pressures from 0.5 to 10 mm. The temperature and pressure just recited are not critical as long as distillation of the water is accomplished. The reaction mixture remaining in the still pot is heated to about 160° C. for six hours under an atmosphere of inert gas such as nitrogen at which time there is added to the reaction mixture a large amount of water, e. g., up to five times the volume of the mixture. The water insoluble polypyrrolidone precipitates and can be isolated in a relatively pure state by simple filtration and water washing.

*Example VI*

The compounds used in Examples II to IV are respectively substituted for the potassium hydroxide of Example V.

*Example VII*

100 parts of pyrrolidone which has been dried by heat at 120° C. in a stream of inert gas for about one hour is treated with about 12.5 parts of freshly cut metallic sodium. The reaction mixture is heated in the still pot to about 160° C. for about six hours under an atmosphere of inert gas such as nitrogen and the system is thereafter once again evacuated and remaining pyrrolidone is distilled under the conditions described above. At all times, care should be taken not to overheat or char the residue which is a mixture of the catalyst and crude polypyrrolidone. The polypyrrolidone is thereafter isolated in relatively pure state by extraction of the residue with hot or cold water whereby the water-soluble catalyst and other soluble impurities are dissolved. The solution is then filtered to recover the relatively pure, insoluble polypyrrolidone. The polypyrrolidone so recovered is in the form of a damp cake which is either air dried or dried in any suitable manner which does not char or decompose the polymer. Preferably, the drying temperature is maintained at 100° C. or lower. The dried product is either dried as an amorphous solid, e. g., as a cake or free-flowing, granular particles or powder. It has a light tan to white color.

To further purify the polymer, 10 parts are dissolved in about 50 to 100 parts, 6-Normal HCl, and the solution treated with activated decolorizing charcoal or carbon. This mixture is then filtered and the polymer is re-precipitated from the solution with ammonia solution to give a uniform white powder.

*Example VIII*

In a vessel equipped for vacuum distillation and mechanical stirring there is placed 1000 parts pyrrolidone to which is added 150 parts potassium hydroxide pellets. The water is then removed as in Example I, i. e., the water formed is removed by distilling off 100 parts of the mixture and the temperature during this operation is controlled so as to be between about 90 and 120° C. at pressures from about 0.5 to 10 mm. 10 parts of this reaction mixture is added to 50 parts pyrrolidone dried as in Example VII and thereafter the process is carried out as described in Example I by heating the reaction mixture remaining in the still pot to at least 160° C. and continuing the procedure as described in Example I.

The product obtained in each of the foregoing examples has been identified as polypyrrolidone and has the formula above indicated. For the purpose of making molded products, the powdered or caked polymer is heated and molded and for the making of fibers and filaments useful in the textile industry, the powder or cake is heated and spun and drawn by conventional methods.

Suitable catalysts for carrying out the reactions in the above examples are the alkali metals such as sodium, potassium and lithium and the corresponding salts of these metals, e. g., the carbonates, as well as hydroxides and oxides of the alkali metals. In this connection, salts of the compound to be polymerized may be used as catalysts such as sodium or potassium or lithium pyrrolidone. In addition, the oxides and hydroxides of the alkaline earth metals, for example, calcium and barium, may be used as catalysts. Also, organic metallic compounds, preferably, those which are strongly basic may be used, such as the lithium, potassium and sodium alkyls, e. g., butyl lithium and the aryls of the said alkali metals, such as sodium phenyl and sodium amide.

The polymerization reaction, as indicated in the foregoing examples, is operable at temperature ranges from 0° to 300° C. For convenience, the most suitable temperature range is between about 75° and 180° C.

The polymerization may be carried out in the foregoing examples in the presence of solvents if desired, such as dioxane, pyridine, quinoline, and dimethyl formamide. The solvents are added either initially with the pyrrolidone or to the residue of the reaction mixture remaining in the still pot at the time the same is heated.

If desired, the reaction described in the foregoing examples may be carried out in a closed vessel at superatmospheric pressure or under a pressure of inert gas, such as nitrogen.

The full mechanism of polymerization is not entirely understood, but it is known that water or any other compound having readily available hydrogen such as acetic acid or methanol is an inhibitor to the polymerization.

As indicated above, the new polymer produced by this invention has many useful properties as, for example, in the making of plastics and coatings and particularly because it can be spun and cold drawn, is highly desirable for making textile fibers. Such fibers are resistant to solvents and to dilute acids and bases and have excellent tensile strength and other desirable textile properties.

We claim:
1. Polypyrrolidone.
2. Polypyrrolidone molding powder.
3. Polypyrrolidone fibers.
4. Polypyrrolidone films.
5. The process which comprises homopolymerizing pyrrolidone in the presence of a polymerization catalyst.
6. The process of claim 5 wherein the polymerization is carried out in the absence of water and other substances having readily available hydrogen.

WILLIAM O. NEY, Jr.
WILLIAM R. NUMMY.
CARL E. BARNES.

References Cited in the file of this patent

FOREIGN PATENTS

| Number | Country | Date |
|--------|---------|------|
| 890,287 | France | Nov. 2, 1943 |
| 897,257 | France | May. 22, 1944 |
| 906,892 | France | June 4, 1945 |
| 60,801 | Denmark | Apr. 17, 1943 |

OTHER REFERENCES

Suomen Kemistilehti, vol. 18B, pages 40–43 (1945).

Abstracted in Chem. Abst., vol. 41, page 769 (1947).

Berichte, vol. 40, pages 2831–2842.